United States Patent Office 3,198,635
Patented Aug. 3, 1965

3,198,635
NUTRIENT COMPOSITIONS AND PROCESS
FOR PREPARING SAME
Philip C. Anderson, Crete, Nebr., assignor to Feed Service
 Corporation, Crete, Nebr., a corporation of Nebraska
No Drawing. Filed Apr. 17, 1964, Ser. No. 361,539
16 Claims. (Cl. 99—2)

This application is a continuation-in-part application of my co-pending application Serial No. 299,163, filed August 1, 1963, now abandoned.

This invention relates to animal nutrition and particularly to compositions for supplying animals with nutritive elements and to methods for the preparation of such compositions.

Valuable domestic and wild animals have a taste sensory system which enables the animal to select the food necessary for adequate nutrition. Such selection depends, among other things, on the animal having a sufficently wide choice available. Natural foodstuffs are variable mixture of nutritive elements which the animal is capable of evaluating quantitatively by his taste sensory system. Prior to consumption, the animal is unable physically to separate wanted elements from those unwanted in such mixtures. Additionally, the animal cannot identify highly insoluble compounds. The result, therefore, is a less-than-optimum diet.

It is common practice today to feed animals supplemental feedstuffs, or completely mixed rations, which have been fortified with a quantity of nutritive elements. The amount of such elements supplied may be far more or far less than the requirements of the particular animal. Consequently, it is not believed to be possible to make an ideal supplement containing a plurality of elements which, when added to forages and grains whose chemical compositions vary widely, will result in an optimum ration. In addition, the optimum amounts of such elements have not been determined with any degree of certainty. The quantity needed varies from one animal to the next, depending on the animal's nutritional status at the time of feeding. The result of this usual procedure of supplementation is some times wasteful in material and is far from satisfactory since the optimum quantity of each element needed is probably received only by a small number of the animals fed.

It has been previously suggested to use the taste sensory system for feeding animals. The various methods suggested for accomplishing this result have been far from effective because of the difficulties involved. The compositions containing the nutritive elements must be supplied to the animal in a tasteful form. Yet, the compositions cannot be so tasteful that they will be consumed by the animal beyond its needs. The elements must also be in a form capable of easy consumption by the animal and, at the same time, have resistance to the weather. The compositions must also be resistant to fungal attacks. The desirability and difficulties of having a composition which can satisfy all or even most of this wide range of requirements are thus readily apparent.

It has been found that the nutritive elements, although they can be incorporated in a binder and then molded into blocks, do not yield the desired results. In this connection, it should be kept in mind that the nutrient blocks, when licked by the animal, must yield the nutritive element in soluble form so that the animal will taste it and continue ingesting it.

This objective has not been achieved, prior to my present invention. For example, it has been found that the oxides, hydroxides, carbonates and phosphates of transitional elements, i.e., those with atomic numbers 22–30, inclusive, are highly insoluble in water. Irrespective of the binder used, these compounds are generally refused by the animals. The more strongly acid salts, such as the sulfates and chlorides, although they, too, can be incorporated in a binder, cannot be used successfully, because they are strongly deliquescent and/or efflorescent, resulting in poor weathering characteristics. In addition, the use of such salts inevitably permits the accumulation of insoluble carbonates and/or metal soaps on the surface of the blocks, due to licking of the block by the animal. This accumulation is self-defeating; and the ability of the animal to taste and continue ingesting the block is inhibited.

In addition, the incorporation of elements such as chlorine, sodium, potassium, sulfur, etc., which are not metabolized to carbon dioxide or water, is undesirable, because, inter alia, the palatability of the nutrient composition may be adversely affected.

In sum, the desired nutrient composition ideally should possess the following properties:

(1) It should contain only one of the elements other than carbon, nitrogen, hydrogen, and oxygen;

(2) It should be of suitable hardness at ambient temperatures so that the animals will lick the composition without engorging on it;

(3) It should be easily hydrolyzed by slightly alkaline saliva;

(4) It should be weatherproof when exposed to the wind, rain, snow, sun, and widely varying conditions of temperatures and humidity;

(5) It should contain only the desired nutritive element plus, if desired, organic substances, such as sugar, which can be readily metabolized by living cells to carbon dioxide and water, leaving no unwanted residue;

(6) It should be resistant to oxidation;

(7) It should be resistant to fungal attack;

(8) It should, indeed, be completely acceptable to animals as a source of the nutritive element;

(9) It should not be consumed because of appetite for the organic components; and

(10) It should not, when being consumed, result in a build-up of insoluble carbonates, hydroxides or metal soaps which thereafter make the composition tasteless and unacceptable.

One of the primary objects of this invention is to produce edible compositions which will satisfy some of the nutritional requirements of animals.

Another object of this invention is to provide nutritionally essential nutritive elements in a biochemically acceptable form, fed separately, ad libitum, to the animal so that each animal can obtain its optimum requirement of each element without ingesting unwanted substances.

A further object of this invention is to employ only naturally-occurring metabolites in the compositions of this invention.

A still further object is to provide compositions containing such elements which remain stable against oxidation and are resistant to climatic deterioration and fungal attacks.

Other objects, including the provisions of processes for preparing the compositions of this invention as well as some of the advantages of this invention, will appear from the following detailed description.

In accordance with the invention, the foregoing objects have been attained, by providing individual compositions, each containing a single nutritive element essential to good nutrition.

The compositions of this invention comprise an intimate mixture of an edible, waxy substance which is solid at ambient temperatures and a member selected from the group consisting of:

(1) A saliva-soluble chelate of citric acid and a nutritive element material, and (2) A saliva-soluble mixture consisting essentially of at least one water-soluble citric acid compound and a nutritive element material selected from the group consisting of a metal oxide, a metal hydroxide and a metal carbonate.

The processes for preparing the compositions of this invention comprise bringing said waxy substance and said member into intimate contact with each other. Various methods for accomplishing this objective are presently contemplated.

One method involves chelating a suitable compound containing the nutritive element in liquid citric acid, allowing the resulting water-soluble chelate complex to harden, and then uniformly dispersing the hardened water-soluble complex in melted edible wax or wax-like material as hereinafter defined.

Another method involves chelating a suitable compound containing a nutritive element in liquid citric acid, allowing the resulting water-soluble chelate complex to harden and then grinding and dispersing, i.e., mixing, it in the waxy substance, in finely divided form, and pressing it into an integral mass.

A third method for preparing the compositions of this invention involves dispersing the aforesaid saliva-soluble mixtures into the waxy substance, which has been melted, thereby forming a suspension, which is then solidified by cooling.

A fourth method in accordance with this invention involves pressing together the aforementioned saliva-soluble mixture and waxy substance, which has been finely divided, so as to form an integral mass.

The resulting nutrient compositions will yield a measure of soluble element when licked by the animal so that the elements can be readily tasted by it. Each novel nutrient composition containing a nutritive element is completely acceptable to animals as a source of the nutritive element and will not ordinarily be consumed by the animal because of its appetite for the auxiliary components. The nutrient, in the form of blocks, is easily eroded by the tongue of an animal. The saliva of the animal is a sodium-rich alkaline liquid which chemically reacts with the waxy material employed in accordance with this invention to form a soluble soap which is easily carried away as the animal licks the surface of the block. The citric acid, citrates and ammonium compounds have chelating ability. The critic acid and the citrates also have the additional function of protecting the compositions against metal-induced oxidation and also serve as antioxidants to keep the wetted surface from becoming rancid and unpalatable. The citrates and citric acid also retard the undesirable oxidation of divalent metals to the trivalent form. The nutrients of the invention make it unnecessary to monitor the elemental content of natural feedstuffs and to compound specific complex mixtures. By placing the nutrient in the form of blocks so that the animal can lick them freely, it has been found that the animal can choose exactly what his taste system dictates.

The ability of citric acid and citrates to function in such a useful manner in the nutrient blocks of this invention is surprising, since the closely-related tartaric and gluconic acids and their salts, are ineffective.

In accordance with the foregoing processes involving chelation, a soluble citrate-element complex is formed by combining citric acid with the particular nutrient element. The allowable ratio is about one to three mols of citric acid for each mol of nutrient element. The preferable ratio is about two mols of citric acid for each mol of nutrient element.

The complex referred to in the preceding paragraph can readily be produced by liquifying the citric acid and then distributing fine particles of the compound containing the nutrient element in the liquid citric acid. The chelate complex forms rapidly and the reaction is complete in a matter of minutes, if high energy mixing is employed. The completion of the reaction is indicated when the mixture ceases to give off water and/or carbon dioxide, depending on the by-products.

It should be emphasized that the chelated complexes are per-citrates, containing more citric acid than the precipitated divalent metal citrates, per mol of metal.

The citric acid employed to make the per-citrates used in this invention should be, preferably, in the form of anhydrous granules, crystals or powder.

The presence of excess water in the per-citrates is to be avoided, as much as possible, as the resulting product will not harden and cannot be easily ground. In adidtion to the water formed by the reaction of the nutrient compound and citric acid, the per-citrates may contain up to about 1 mol of water for each metal-unassociated carboxyl group of the citric acid. In the event more than this amount of water is present, it should be removed for best results. Any suitable means for removing the excess water may be employed. Physical drying agents, such as carboxylmethyl cellulose, are preferred. Care should be exercised so as to avoid the removal of water of hydration or to cause actual alteration of the ratio of metal and citric acid in the complex. If too much water is removed, the resulting product is unsuitable for the purposes of carrying out the chelating processes of this invention, being insoluble and, in the case of actual alteration of the formula of the product, the resulting metal-citric acid product no longer may be a per-citrate but has a citric acid to metal ratio below the allowable one of 1–3 mols of citric acid to 1 mol of nutrient element.

In preparing the per-citrate the citric acid is generally melted, e.g., by heating it up to about 150° C. to about 160° C. It is important to avoid temperatures in excess of about 175° C., which can cause breakdown of the acid.

The citrate chelate is dispersed in the edible wax to form the nutrient composition. This is conveniently accomplished by grinding or otherwise disintegrating the chelate to a fine particle size or powder. The waxy binder may either be melted and mixed with the finely divided chelate to produce a suspension, or the binder and chelate may be mixed and pressed together to form an integral mass, as hereinafter described. It is important that the melted waxy substance be kept below the melting point of the hydrous citric acid (100° C.) during the dispersion, in order to prevent interference with the citrate-metal chelate.

In carrying out the aforesaid third method of preparing the compositions of this invention, the ingredients, without prior reaction and in finely divided form, e.g., about 40 mesh, are dispersed in the melted waxy substance. Here, too, it is important that the temperature of the melted waxy substance be kept below about 100° C. during the dispersion. Carbonates, while useful in the process under discussion are not preferred, as are oxides and hydroxides. Carbonates yield more or less carbon dioxide when mixed with hot waxy substances and lessen the resulting physical strength of the block. Excessive wax usually results in a poorer block, i.e., one less readily tasted, by the animals.

In carrying out the aforesaid fourth process, all of the ingredients, including the waxy substance, are in finely divided form and are simply pressed together to form an integral mass. The process as presently practiced involves the use of a tableting press, to form tablets of about 10 cm. diameter x 3⅓ cm. in thickness. Pressures of the order of about 2,000 to 3,000 pounds per square inch are employed to form the tablets.

The speed of formation of the tablets is, desirably, about 6 tablets per minute when using a Stokes Model R Single Punch Press. Although sizable equipment is envolved, nutrient blocks made by this method with metal carbonates are preferred. Carbon dioxide is released during the animal's licking process which renews the surface and keeps the solubility of the surface more desirable.

To form nutrient blocks of convenient size to be presented to animals, I presently prefer to unite three of the tablets as described below. This is done by dipping the tablets in melted waxy material, suitably the same material employed in the compositions of this invention and then, while the tablets are still tacky, stacking three tablets over a disk of plywood about 2 cm. thick and of the same diameter as the individual tablets and which has also been dipped in the melted waxy substance and is still tacky. Upon cooling, the stack of three tablets and plywood unite to form an integral mass, or block. The resulting nutrient block may then be presented to the animal as hereinafter described. The top surface of the block is not wax coated.

The second method hereinabove referred to is carried out in the same manner as in the fourth method, except that in the former, the chelate is prepared and ground prior to being dispersed in or mixed with the waxy substance.

The nutritive elements to which this invention is particularly directed are iron, cobalt, nickel, manganese, copper, zinc, calcium or magnesium. However, if desired, other elements can be utilized, such as aluminum or titanium, which have not, as yet, been found to be definitely essential to the diet of animals. Any nutritive element which can be chelated, as a cation, with citric acid, can be used in the invention. Feed grade nutrient compounds containing such elements are of sufficient purity. Typical sources of the elements are the oxides, carbonates, and hydroxides.

Typical examples of suitable compounds in accordance with this invention are manganous carbonate, manganous hydroxide, ferrous carbonate, cobaltous hydroxide, cobaltous carbonate, nickel carbonate, cupric hydroxide, zinc oxide, zinc carbonate, calcium oxide, calcium hydroxide, calcium carbonate, magnesium oxide, magnesium hydroxide, and magnesium carbonate. Best results are obtained when the nutrient-containing compounds are added in the form of a fine powder, e.g., having a particle size of from about 0.03 to 0.003 inch, diameter.

The edible waxy materials used in accordance with this invention are fatty acids, their esters and alcohols which have a carbon chain length from about 14 to about 20 atoms per molecule.

In general, any edible waxy material which is solid at ambient temperatures may be used. Such materials which melt within the range from about 50° C. to about 80° C. are preferred as far as is presently known. The wax can be one of these compounds alone or it can be a mixture of these compounds. A presently-preferred waxy material is that known and marketed in the U.S.A. as food grade stearic acid, double pressed. The composition of this product as purchased on the market has been found to be as follows:

| | Percent |
|---|---|
| Stearic acid | 39.0 |
| Palmitic acid | 52.0 |
| Oleic acid | 4.0 |
| Myristic acid | 2.5 |
| Margaric acid | 2.0 |
| Pentadecylic acid | 0.5 |

The wax usually represents from about 15 to 60% of the nutrient composition or block; this amount is not critical but represents that found to be most useful.

In use, the compositions of this invention are formed into blocks and presented to the animals in suitable feeding devices so designed as to permit the animal to lick the surface but to prevent it from biting off chunks or pieces.

In forming the blocks in accordance with the processes involving the use of melted wax, the suspension containing the melted waxy substance and the other ingredients is poured into a suitable container and then the suspension is permitted to cool and harden. While any suitable molds can be used, it has been found that cylindrical paper cartons, such as those commonly used for liquid food products and frozen confections, e.g., ice cream, are particularly appropriate.

In place of the plywood disc above mentioned, a layer of about 2 cm. thick of any suitable edible waxy material, as hereinabove defined, can be formed on top of the block by pouring the melted waxy material on the top and then letting it cool and harden.

The resulting nutrient blocks are removed from the mold in any convenient manner. Where the paper cartons are employed, they may be stripped off the block by peeling or other suitable technique.

A suitable feeding device for holding the nutrient blocks of this invention, while they are presented to the animals, is essential, as aforesaid. One which is particularly convenient for feeding cattle is described as follows:

A 15 cm. by 15 cm. wood piece, 2 meters long, is drilled to form holes, each 11 cm. in diameter, and 15 cm., center to center, to a depth of 12 cm.

The number of holes to be drilled may vary, and, in general, corresponds to the number of elements to be presented, as a set, to the animals. For purposes of illustration, it is assumed that a set of 8 elements plus a control plus a duplicate block of an element known to be heavily consumed, is to be presented, and, accordingly 10 holes are to be drilled. The remaining 3 cm. of depth is then drilled to form holes 5 cm. in diameter, concentric with the holes of 11 cm. diameter.

Eight nutrient blocks made in accordance with the present invention, each containing a different element, selected from the group consisting of iron, cobalt, nickel, manganese, copper, zinc, calcium and magnesium, are then inserted into the 11 cm. diameter holes. The ninth hole can be a control, made in accordance with the present invention except that it has no nutrient metal. In other words, the composition of such a block could be citric acid and a waxy binder as hereinabove defined, with or without sugar, or other additive. It is found that the animal does not consume any of this control. The tenth hole could be filled with a block which is a duplicate of any of the eight aforementioned blocks containing nutritive elements. If desired, a block containing any other nutrient may also be provided.

The appropriate size of the blocks for the holes would be 10 cm. in diameter and 10 cm. in length (exclusive of the wax or plywood base layer), with a 2 cm. layer of wax or plywood. The blocks are inserted so that the wax or plywood layer is on the bottom. The blocks should, preferably, not protrude above the holes as otherwise, the animal may bite off chunks of the block and the full benefits of this invention may not be realized. The wax or plywood layer allows the nutrient block to be consumed without the last fragment being eaten at one time. This desirable result obtains because the animals refuse to eat the wax or plywood by itself, and, moreover, the wax or plywood layer helps to keep the last fragments of the block bound together and in what may be called a lickable condition.

The 5 cm. holes in the feeder serve as a water drain, to prevent water, saliva, etc. from accumulating under the wax block, with consequent deleterious results, including the risk of the nutrient block being floated out of the holes.

The feeders may be provided with suitable brackets and secured to any convenient support, such as fence posts or fence boards. If desired, the feeders may be mounted on their sides, so that the animals can lick the blocks from the sides of the feeders, instead of from the tops. Side feeders stay much cleaner in use than top feeders. When side feeders are employed, removable strips of wood of suitable size and configuration may be removably secured, as by screws, along the top of the feeder so that the blocks cannot slide out horizontally.

Desirably, the blocks in the feeder should be at or around the level of the heads of the animals.

In order to attain the full advantages of this invention, a complete set of blocks made in accordance herewith should be offered, free choice or ad libitum, to the animal. Thus, separate blocks, each containing one of the following elements, are to be offered: maganese, iron, cobalt, nickel, copper, zinc, calcium and magnesium. In the event one or more of the foregoing elements are lacking, their absence may be sufficient to limit the biological need for one or more of the others, with a resulting decrease in overall effectiveness.

In one embodiment of the invention, a sweetening agent is added to the nutrient block to overcome the acid taste caused by the low pH of the composition. Sucrose is particularly effective in this regard since it will complex with the citrate to make a larger molecule. Any of the mono-, di-, tri-, or tetra-saccharides can be used, however. The presence of the sugar decreases the rate of penetration of the composition into the cells of the taste buds and decreases the ability of the citric acid to increase the hydrogen ion concentration inside the cells. The effect is a strongly-modified taste wherein the metal taste is enhanced but the acid taste is decreased. In such compositions, the low pH remains to continue to promote maximum solubility of the element and probably also aids resistance to fungus attacks. The presence of the sugar has an additional advantage since it functions as an antifreeze, tending to reduce freezing of saliva on the surface of the blocks during the winter. As a general rule, about one mol of sucrose is added for each one to three mols of citric acid. The sugar is admixed with the other ingredients, in any mixing order.

In place of the carbohydrate sweeteners referred to in the preceding paragraph, other sweeteners suitable for food use can be employed. Examples of such sweeteners are saccharin (both the so-called water-soluble and water-insoluble types) and the cyclamate salts. Inasmuch as these sweeteners are greater in sweetening power than sugar, smaller amounts of the such sweeteners, in inverse ratio to their sweetening power, may be used. For example, the relative sweetness of these sweeteners is shown below.

Sucrose _____ 100
Saccharin _____ 30,000–55,000
Sodium cyclamate _____ 7,150

Accordingly, the amount of saccharin to use is approximately 1/550 to 1/300 that of sugar, and that of cyclamate to use is about 1/70 that of sugar.

The non-sucrose sugars may be added to the compositions of this invention in any convenient manner.

It is desirable to make compositions in accordance with methods three and four aforesaid such that the mixture of non-waxy ingredients, in the form of a 10% by weight aqueous solution thereof, has a pH of about 3.5 to about 5.5, and preferably within the range of about 4.0 to about 4.5.

The desirable pH range is advantageously obtained by using ammonium citrate, ammonium carbonate or ammonium bicarbonate. An unexpected advantage resulting from the use of the aforesaid ammonium compounds is that the ammonium radical assists in improving the solubility of the non-waxy mixture in saliva and water.

It shall be understood that if desired, that additional compounds can be added to the compositions of the invention such as, for example, sodium bicarbonate, sodium hydroxide, sodium chloride, sodium sulfate, and the like. Such additions, however, are adulterants and care must be exercised so as not to include elements which are already amply present in the animal's rations, or elements which are so deficient in the ration that the animal may voluntarily consume the block for the adulterant.

The following examples are given for purposes of illustration. The parts in the examples and claims are by weight, unless otherwise stated.

Example 1

A nutrient block was prepared from the following materials:

| | Grams |
|---|---|
| Manganese carbonate (46% Mn) | 40 |
| Anhydrous citric acid | 128 |
| Food grade stearic acid | 90 |

The citric acid was melted by heating it to a temperature of 160° C. The powdered manganese carbonate was then rapidly added to the melted acid with vigorous stirring. The temperature and mixing were maintained until the foaming ceased (about two minutes) and the mixture was immediately cooled to solidify the composition. The composition weighed 154 grams, indicating a loss of 14 grams. The solid citrate-metal chelate composition was then ground to pass through a 20-mesh screen.

The waxy food grade stearic acid was heated to 80° C. and the ground chelate was slowly added, with stirring, thereto to form a uniform suspension of the chelate in the waxy material. The resulting mixture was formed into small nutrient blocks as aforesaid. It is an excellent source of manganese for addition to the diet of an animal, especially when employed in a set and in special feeders, as aforesaid, in accordance with this invention. The block was pinkish-tan in color and had a melting point of about 76° C. Like the nutrient blocks of all of the examples herein, the composition of this example was odorless to human beings, and possesses all of the desirable properties, such as stability, weather-resistance, palatability and solubility in the saliva of animals, as aforesaid.

The animal is able to ingest its optimum requirements by licking the block. The block shows no deterioration after extended periods of exposure to climatic conditions.

Substantially the same results were obtained when this example was repeated except that the ground chelate was mixed with the waxy substance (food grade stearic acid) and pressed into tablets at the rate of 6 tablets per minute under a pressure of 2400 pounds per square inch, and then formed into blocks, following the procedure hereinabove referred to and described as the second process.

Example 2

Following the procedure of Example 1, a nutrient block was prepared from the following materials:

| | Grams |
|---|---|
| Ferrous carbonate (33.6% Fe) | 55 |
| Anhydrous citric acid | 128 |
| Food grade stearic acid | 90 |

The citric acid-metal chelate lost 14 grams in weight in preparation.

The nutrient composition is gray-black, has a melting point of 80° C. and is an excellent source of iron for animals, especially when employed in a set and in special feeders, as aforesaid, with other nutrient blocks made in accordance with this invention.

Example 3

Following the procedure of Example 1, a nutrient block was prepared from the following materials:

| | Grams |
|---|---|
| Cobalt carbonate (46% Co) | 42.7 |
| Anhydrous citric acid | 128 |
| Food grade stearic acid | 90 |

The citric acid-metal chelate lost 14.8 grams in weight in preparation.

The nutrient composition is violet in color, has a melting point of 65° C., and is an excellent source of cobalt for animals, especially when employed, as aforesaid, in a set and in special feeders, in accordance with this invention.

Example 4

Following the procedure of Example 1, a nutrient block was prepared from the following materials:

| | Grams |
|---|---|
| Nickel carbonate (46% Ni) | 42.5 |
| Anhydrous citric acid | 128 |
| Food grade stearic acid | 90 |

The citric acid-metal chelate lost 13.1 grams in preparation.

The nutrient block formed is light green in color, has a melting point of 62° C., and is an excellent source of nickel for animals, especially when employed as part of a set, and in special feeders, as aforesaid, in accordance with this invention.

Example 5

Following the procedure of Example 1, a nutrient block was prepared from the following materials:

| | Grams |
|---|---|
| Cupric carbonate (55% Cu) | 38.5 |
| Anhydrous citric acid | 128 |
| Food grade stearic acid | 90 |

The citric acid-metal chelate lost 13.1 grams in preparation.

The nutrient block formed is dark green in color, has a melting point of 86° C., and is an excellent source of copper for animals, especially when employed in a set, and in special feeders, as aforesaid, in accordance with this invention.

Example 6

Following the procedure of Example 1, a nutrient block was prepared from the following materials:

| | Grams |
|---|---|
| Zinc carbonate (58.1% Zn) | 38.5 |
| Anhydrous citric acid | 128 |
| Food grade stearic acid | 90 |

The citric acid-metal chelate lost 13.1 grams in preparation.

The nutrient block formed is white to light yellow in color, has a melting point of 77° C., and is an excellent source of zinc for animals, especially when employed in a set and in special feeders, as aforesaid, in accordance with this invention.

Example 7

Following the procedure of Example 1, a nutrient block was prepared from the following materials:

| | Grams |
|---|---|
| Manganite (66.8% Mn, $Mn_2O_2(OH)_2$) | 27.4 |
| Anhydrous citric acid | 128 |
| Food grade stearic acid | 90 |

The nutrient block formed is pinkish-tan in color, has a melting point of 62° C., and is an excellent source of manganese for animals, especially when employed in a set, and in special feeders, as aforesaid, in accordance with this invention.

Example 8

Following the procedure of Example 1, a nutrient block was prepared from the following materials:

| | Grams |
|---|---|
| Zinc carbonate, $ZnCO_3$ | 109 |
| Anhydrous citric acid | 576 |
| Myristic acid wax | 152 |

The citric acid-metal chelate lost 44 grams in preparation.

The nutrient block formed is white to light yellow in color, has a melting point of 70° C., and is an excellent source of zinc for animals, especially when employed in a set, and in special feeders, as aforesaid, in accordance with this invention.

Example 9

Following the procedure of Example 1, a nutrient block was prepared from the following materials:

| | Grams |
|---|---|
| Manganese carbonate (46% Mn) | 120 |
| Anhydrous citric acid | 192 |
| Arachidic acid | 312.5 |

The citric acid-metal chelate lost 44 grams in preparation.

The nutrient block formed is pink-tan in color, has a melting point of 84° C., and is an excellent source of manganese for animals, especially when employed in a set, and in special feeders, as foresaid, in accordance with this invention.

Example 10

Following the procedure of Example 1, a nutrient block was prepared from the following materials:

| | Grams |
|---|---|
| Cupric hydroxide (64% Cu) | 100 |
| Anhydrous citric acid | 576 |
| Food grade stearic acid | 540 |

The nutrient block formed is blue-green in color, has a melting point of 69° C., and is an excellent source of copper for animals, especially when employed as part of a set, and in special feeders, as aforesaid, in accordance with this invention.

Example 11

Following the procedure of Example 1, a nutrient block was prepared from the following materials:

| | Grams |
|---|---|
| Cobalt hydroxide (61% Co) | 97 |
| Anhydrous citric acid | 192 |
| Food grade stearic acid | 125 |

The nutrient block formed is rose-pink in color, has a melting point of 71° C., and is an excellent source of cobalt for animals, especially when employed in a set, and in special feeders, as aforesaid, in accordance with this invention.

Example 12

Following the procedure of Example 1, a nutrient block was prepared from the following materials:

| | Grams |
|---|---|
| Cupric hydroxide (64% Cu) | 33 |
| Anhydrous citric acid | 128 |
| Food grade stearic acid | 90 |

The nutrient block formed in blue-green in color, has a melting point of 80° C., and is an excellent source of copper for animals, especially when employed in a set, and in special feeders, as aforesaid in accordance with this invention.

Example 13

Following the procedure of Example 1, a nutrient block was prepared from the following materials:

| | Grams |
|---|---|
| Cobalt hydroxide (61% Co) | 32 |
| Anhydrous citric acid | 128 |
| Food grade stearic acid | 90 |

The nutrient block formed is rose-pink in color, has a melting point of 62° C., and is an excellent source of cobalt for animals, especially when employed in a set, and in special feeders, as aforesaid, in accordance with this invention.

Example 14

Following the procedure of Example 1, a nutrient block was prepared from the following materials:

| | Grams |
|---|---|
| Zinc oxide (80% Zn) | 27.3 |
| Anhydrous citric acid | 128 |
| Food grade stearic acid | 90 |

The nutrient block formed is white in color, has a melting point of 70° C., and is an excellent source of zinc for animals, especially when employed in a set, and in special feeders, as aforesaid, in accordance with this invention.

*Example 15*

Following the procedure of Example 1, a nutrient block was prepared from the following materials:

| | Grams |
|---|---|
| Calcium oxide (71.5% Ca) | 19 |
| Anhydrous citric acid | 128 |
| Food grade stearic acid | 90 |

The nutrient block formed is white in color, has a melting point of 64° C., and is an excellent source of calcium for animals, especially when employed in a set, and in special feeders, as aforesaid, in accordance with this invention.

*Example 16*

A nutrient block was prepared from the following materials:

| | Grams |
|---|---|
| Manganese carbonate (46% Mn) | 40 |
| Anhydrous citric acid | 128 |
| Food grade stearic acid | 90 |
| Sucrose | 114 |

The procedure of Eaxmple 1 was followed up to and including the formation of the chelate composition and the grinding of same through a 20 mesh screen. The sucrose was then added to the chelate and then both were (1) suspended in the stearic acid and (2) tabletted, as in Example 1, and then formed into blocks. The chelate lost 14 grams in preparation.

The nutrient block formed is pink-tan in color, has a melting point of 66° C., and is an excellent source of manganese for animals, especially when employed in a set, and in special feeders, as aforesaid in accordance with this invention.

*Example 17*

Following the procedure of Example 16, a nutrient block was prepared from the following materials:

| | Grams |
|---|---|
| Ferrous carbonate (33.6% Fe) | 55 |
| Anhydrous citric acid | 128 |
| Food grade stearic acid | 95 |
| Sucrose | 114 |

The chelate lost 14 grams in weight preparation.

The nutrient block formed is gray-black in color, has a melting point of 80° C., and is an excellent source of iron for animals, especially when employed in a set, and in special feeders, as aforesaid, in accordance with this invention.

*Example 18*

Following the procedure of Example 16, a nutrient block was prepared from the following materials:

| | Grams |
|---|---|
| Cobalt carbonate (46% Co) | 42.7 |
| Anhydrous citric acid | 128 |
| Food grade stearic acid | 91 |
| Sucrose | 114 |

The chelate lost 14.8 grams in weight in preparation.

The nutrient block is violet in color, has a melting point of 79° C., and is an excellent source of cobalt for animals, especially when employed in a set, and in special feeders, as aforesaid, in accordance with this invention.

*Example 19*

Following the procedure of Example 16, a nutrient block was prepared from the following materials:

| | Grams |
|---|---|
| Nickel carbonate (46% Ni) | 42.5 |
| Anhydrous citric acid | 128 |
| Food grade stearic acid | 91 |
| Sucrose | 114 |

The chelate lost 13.1 grams in weight in preparation.

The nutrient block formed is light green in color, has a melting point of 64° C., and is an excellent source of nickel for animals, especially when employed in a set, and in special feeders, as aforesaid, in accordance with this invention.

*Example 20*

Following the procedure of Example 16, a nutrient block was prepared from the following materials:

| | Grams |
|---|---|
| Cupric carbonate (55% Cu) | 38.5 |
| Anhydrous citric acid | 128 |
| Food grade stearic acid | 90 |
| Sucrose | 114 |

The chelate lost 13.1 grams in weight in preparation.

The nutrient block is dark green in color, has a melting point of 70° C., and is an excellent source of copper for animals, especially when employed in a set, and in special feeders, as aforesaid, in accordance with this invention.

*Example 21*

Following the procedure of Example 16, a nutrient block was prepared from the following materials:

| | Grams |
|---|---|
| Zinc carbonate (58.1% Zn) | 37.4 |
| Anhydrous citric acid | 128 |
| Food grade stearic acid | 90 |
| Sucrose | 114 |

The chelate lost 14 grams in weight in preparation.

The nutrient block is white to light yellow in color, has a melting point of 64° C., and is an excellent source of zinc for animals, especially when employed in a set, and in special feeders, as aforesaid, in accordance with this invention.

*Example 22*

Following the procedure of Example 1, a nutrient block was prepared from the following materials:

| | Grams |
|---|---|
| Magnesium carbonate | 42 |
| Anhydrous citric acid | 128 |
| Food grade stearic acid | 125 |

The nutrient composition is white in color, has a melting point of 65° C., and is an excellent source of magnesium for animals, especially when employed in a set, and in special feeders, as aforesaid, in accordance with this invention.

The procedure of Examples 16 through 21 was repeated, using 0.8 gram of water-insoluble saccharin in place of the 114 grams of sugar and adding the saccharin to the melted citric acid.

*Example 23*

A nutrient block was prepared from the following materials:

| | Grams |
|---|---|
| Manganese carbonate | 159 |
| Ammonium citrate | 239 |
| Citric acid | 147 |
| Stearic acid, food grade | 147 |

The procedure of the fourth process was followed. The ingredients were all mixed together, ground, and then pressed under 2600 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood.

This block has the characteristic mildly acid manganesic taste. It is a medium brown color. Its density is about 1.32 grams per cubic centimeter. When heated, in an oven, it becomes sticky or tacky at about 83° C.

When employed as a nutrient block, as aforesaid, the block of this example is an excellent source of manganese.

*Example 24*

A nutrient block was prepared from the following materials:

| | Grams |
|---|---|
| Ferrous carbonate | 159 |
| Ammonium citrate | 239 |
| Citric acid | 147 |
| Stearic acid, food grade | 147 |

The procedure of the fourth process was followed. The ingredients were all mixed together, ground, and then pressed under 2400 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood.

This block has the characteristic mildly acid ferruginous taste. It is a dark grey color. Its density is about .91 gram per cubic centimeter. When heated, in an oven, it becomes sticky or tacky at about 83° C.

When employed as a nutrient block, as aforesaid, the block of this example is an excellent source of iron.

*Example 25*

A nutrient block was prepared from the following materials:

| | Grams |
|---|---|
| Cobalt carbonate | 159 |
| Ammonium citrate | 239 |
| Citric acid | 147 |
| Stearic acid, food grade | 147 |

The procedure of the fourth process was followed. The ingredients were all mixed together, ground, and then pressed under 2300 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood.

This block has the faint, but characteristic mildly acid cobaltic taste. It is a dark purplish brown color. Its density is about 1.18 grams per cubic centimeter. When heated, in an oven, it becomes sticky or tacky at about 76° C.

When employed as a nutrient block, as aforesaid, the block of this example is an excellent source of cobalt.

*Example 26*

A nutrient block was prepared from the following materials:

| | Grams |
|---|---|
| Cupric carbonate | 159 |
| Ammonium citrate | 239 |
| Citric acid | 147 |
| Stearic acid, food grade | 147 |

The procedure of the fourth process was followed. The ingredients were all mixed together, ground, and then pressed under 2600 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood.

This block has the strong characteristic, mildly acid cupric taste. It is a bluish green color. Its density is about 1.37 grams per cubic centimeter. When heated, in an oven, it becomes sticky or tacky at about 83° C.

When employed as a nutrient block, as aforesaid, the block of this example is an excellent source of copper.

*Example 27*

A nutrient block was prepared from the following materials:

| | Grams |
|---|---|
| Zinc carbonate | 159 |
| Ammonium citrate | 239 |
| Citric acid | 147 |
| Stearic acid, food grade | 147 |

The procedure of the fourth process was followed. The ingredients were all mixed together, ground, and then pressed under 2200 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood.

This block has the characteristic mildly acid zincous taste. It is a near white color. Its density is about 1.14 grams per cubic centimeter. When heated in an oven, it becomes sticky or tacky at about 83° C.

When employed as a nutrient block, as aforesaid, the block of this example is an excellent source of zinc.

*Example 28*

A nutrient block was prepared from the following materials:

| | Grams |
|---|---|
| Nickel carbonate | 159 |
| Ammonium citrate | 239 |
| Citric acid | 147 |
| Stearic acid, food grade | 147 |

The procedure of the fourth process was followed. The ingredients were all mixed together, ground, and then pressed under 2600 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood.

This block has the characteristic mildly acid nickelous taste. It is a green color. Its density is about 1.22 grams per cubic centimeter. When heated in an oven, it becomes sticky or tacky at about 80° C.

When employed as a nutrient block, as aforesaid, the block of this example is an excellent source of nickel.

*Example 29*

A nutrient block was prepared from the following materials:

| | Grams |
|---|---|
| Manganese hydrate (67% Mn) | 53 |
| Ammonium citrate, dibasic | 136 |
| Anhydrous citric acid | 129 |
| Stearic acid | 136 |

The procedure of the third process was followed. The manganese hydrate, ammonium citrate and citric acid, in finely divided forms, were mixed together and slowly added to melted stearic acid (90° C.), with good stirring, thereby creating a suspension. The final mixture was then poured into paper cartons and allowed to cool. Thereafter, additional melted stearic acid was poured to a depth of about 2 cm. and allowed to cool to form the base. The block contains 7.7 percent manganese.

The block is a deep brown color and has a density of about 1.35. This block has the characteristic mildly acid manganesic taste, and has excellent resistance to weathering. When heated in an oven, it becomes sticky or tacky at about 75° C.

When employed as a nutrient block, as aforesaid, the block of this example is an excellent source of manganese.

*Example 30*

A nutrient block was prepared from the following materials:

|  | Grams |
| --- | --- |
| Cobalt hydrate (60% Co) | 57 |
| Ammonium citrate, dibasic | 134 |
| Anhydrous citric acid | 127 |
| Stearic acid | 136 |

The procedure of the third process was followed. The cobalt hydrate, ammonium citrate and citric acid, in finely divided forms, were mixed together and slowly added to melted stearic acid (90° C.), with good stirring, thereby creating a suspension. The final mixture was then poured into paper cartons and allowed to cool. Thereafter, additional melted stearic acid was poured to a depth of about 2 cm. and allowed to cool to form the base. The block contains 7.5 percent cobalt.

The block is a purplish-pink color and has a density of about 1.15. This block has the characteristic mildly acid cobaltous taste, and has excellent resistance to weathering. When heated in an oven, it becomes sticky or tacky at about 76° C.

When employed as a nutrient block, as aforesaid, the block of this example is an excellent source of cobalt.

*Example 31*

A nutrient block was prepared from the following materials:

|  | Grams |
| --- | --- |
| Nickel hydrate (60% Ni) | 57 |
| Ammonium citrate, dibasic | 134 |
| Anhydrous citric acid | 127 |
| Stearyl alcohol | 136 |

The procedure of the third process was followed. The nickel hydrate, ammonium citrate and citric acid, in finely divided forms, were mixed together and slowly added to melted stearyl alcohol (90° C.) with good stirring, thereby creating a suspension. The final mixture was then poured into paper cartons and allowed to cool. Thereafter, additional melted stearyl alcohol was poured to a depth of about 2 cm. and allowed to cool to form the base. The block contains 7.5 percent nickel.

The block is a deep green color and has a density of about 1.29. This block has the characteristic mildly acid nickelous taste, and has excellent resistance to weathering. When heated in an oven, it becomes sticky or tacky at about 86° C.

When employed as a nutrient block, as aforesaid, the block of this example is an excellent source of nickel.

*Example 32*

A nutrient block was prepared from the following materials:

|  | Grams |
| --- | --- |
| Copper hydrate (55% cu.) | 98 |
| Ammonium citrate, dibasic | 114 |
| Anhydrous citric acid | 106 |
| Cetyl alcohol | 136 |

The procedure of the third process was followed. The copper hydrate, ammonium citrate and citric acid, in finely divided forms, were mixed together and slowly added to melted cetyl alcohol, (85° C.), with good stirring, thereby creating a suspension. The final mixture was then poured into paper cartons and allowed to cool. Thereafter, additional melted cetyl alcohol was poured to a depth of about 2 cm. and allowed to cool to form the base. The block is 11.8 percent copper.

The block is a deep blue color and has a density of about 1.28. This block has the characteristic mildly acid cupric taste, and has excellent resistance to weathering. When heated in an oven, it becomes sticky or tacky at about 68° C.

When employed as a nutrient block, as aforesaid, the block of this example is an excellent source of copper.

*Example 33*

A nutrient block was prepared from the following materials:

|  | Grams |
| --- | --- |
| Manganese carbonate (45% mn.) | 77 |
| Ammonium citrate, dibasic | 143 |
| Anhydrous citric acid | 121 |
| Cetyl palmitate | 113 |

The procedure of the third process was followed. The manganese carbonate, ammonium citrate and citric acid, in finely divided forms, were mixed together and slowly added to melted cetyl palmitate (90° C.), with good stirring, thereby creating a suspension. The final mixture was then poured into paper cartons and allowed to cool. Thereafter, additional melted cetyl palmitate was poured to a depth of about 2 cm. and allowed to cool to form the base. The block contains 7.7 percent manganese.

The block is a brown color and has a density of about 1.33. This block has the characteristic mildly acid manganesic taste, and has excellent resistance to weathering. When heated in an oven, it becomes sticky or tacky at about 65° C.

When employed as a nutrient block, as aforesaid, the block of this example is an excellent source of manganese.

The pH of a 10 percent solution of non-wax ingredients is 4.0.

*Example 34*

A nutrient block was prepared from the following materials:

|  | Grams |
| --- | --- |
| Ferrous carbonate (36% fe.) | 92 |
| Ammonium citrate, dibasic | 135 |
| Anhydrous citric acid | 114 |
| Stearic acid | 113 |

The procedure of the third process was followed. The ferrous carbonate, ammonium citrate and citric acid, in finely divided forms, were mixed together and slowly added to melted stearic acid (90° C.), with good stirring, thereby creating a suspension. The final mixture was then poured into paper cartons and allowed to cool. Thereafter, additional melted stearic acid was poured to a depth of about 2 cm. and allowed to cool to form the base. The block contains 7.3 percent iron.

The block is a dark grey color and has a density of about 1.33. This block has the characteristic mildly acid ferruginous taste, and has excellent resistance to weathering. When heated in an oven, it becomes sticky or tacky at about 75° C.

When employed as a nutrient block, as aforesaid, the block of this example is an excellent source of iron.

The pH of a 10 percent aqueous solution of the non-wax fraction is 4.1.

Example 35

A nutrient block was prepared from the following materials:

| | Grams |
|---|---|
| Copper carbonate | 204 |
| Anhydrous citric acid | 163 |
| Stearic acid | 87 |

The procedure of the third process was followed. The copper carbonate, and citric acid, in finely divided forms, were mixed together and slowly added to melted stearic acid (90° C.), with good stirring, thereby creating a suspension. The final mixture was then poured into paper cartons and allowed to cool. Thereafter, additional melted stearic acid was poured to a depth of about 2 cm. and allowed to cool to form the base. The block contains 8.3 percent copper.

The block is a blue green color and has a density of about 1.28. This block has the characteristic acid cupric taste, and has excellent resistance to weathering. When heated in an oven, it becomes sticky or tacky at about 70° C.

When employed as a nutrient block, as aforesaid, the block of this example is an excellent source of copper.

Example 36

A nutrient block was prepared from the following materials:

| | Grams |
|---|---|
| Zinc oxide (80% zn.) | 50 |
| Ammonium citrate, dibasic | 134 |
| Citric acid | 134 |
| Stearic acid, food grade | 136 |

The procedure of the fourth process was followed. The ingredients were all mixed together, ground, and then pressed under 2000 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood. The block contains 8.8 percent zinc.

This block has the characteristic mildly acid zincous taste. It is a white color. Its density is about .91 gram per cubic centimeter. When heated in an oven, it becomes sticky or tacky at about 85° C.

When employed as a nutrient block, as aforesaid, the block of this example is an excellent source of zinc.

Example 37

A nutrient block was prepared from the following materials:

| | Grams |
|---|---|
| Copper hydrate (55% cu.) | 50 |
| Ammonium citrate, dibasic | 143 |
| Citric acid, anhydrous | 125 |
| Stearic acid, food grade | 136 |

The procedure of the fourth process was followed. The ingredients were all mixed together, ground, and then pressed under 2600 pounds per square inch pressure in the aforementiode Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood. The block contains 6.17 percent copper.

This block has the characteristic acid copper taste. It is a bluish green color. Its density is about 1.10 grams per cubic centimeter. When heated in an oven, it becomes sticky or tacky at about 75° C.

When employed as a nutrient block, as aforesaid, the block of this example is an excellent source of copper.

Example 38

A nutrient block was prepared from the following materials:

| | Grams |
|---|---|
| Zinc oxide | 79 |
| Ammonium bicarbonate | 77 |
| Citric acid | 185 |
| Stearic acid, food grade | 113 |

The procedure of the fourth process was followed. The ingredients were all mixed together, ground, and then pressed under 2300 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allower to cool, whereupon a block was formed by the aggregation of tablets and plywood. The block contains 13.9 percent zinc.

This block has the characteristic mildly acid zincous taste. It is a white color. Its density is about .88 gram per cubic centimeter. When heated in an oven, it becomes sticky or tacky at about 85° C.

When employed as a nutrient block, as aforesaid, the block of this example is an excellent source of zinc.

Example 39

A nutrient block was prepared from the following materials:

| | Grams |
|---|---|
| Ferrous carbonate (36% Fe) | 145 |
| Ammonium citrate | 106 |
| Citric acid | 90 |
| Stearyl palmitate | 113 |

The procedure of the fourth process was followed. The ingredients were all mixed together, ground, and then pressed under 2800 pounds per square inch pressure in the aforementioned Stokes punch press, operating at six tablets per minute. The three tablets were dipped in melted stearyl palmitate, as was a disc of plywood of the aforementioned dimensions. The three tablets were stacked over the coated plywood disc and allowed to cool, whereupon a block was formed by the aggrregation of tablets and plywood. The block contains 11.5% Fe.

This block has the characteristic mildly acid ferruginous taste. It is a dark grey color. Its density is about 1.26 grams per cubic centimeter. When heated in an oven, it becomes sticky or tacky at about 75° C.

When employed as a nutrient block, as aforesaid, the block of this example is an excellent source of iron.

Example 40

A nutrient block was prepared from the following materials:

| | Grams |
|---|---|
| Cobaltous carbonate (46% Co) | 43 |
| Ammonium citrate | 116 |
| Citric acid | 98 |
| Stearic acid, food grade | 197 |

The procedure of the fourth process was followed. The ingredients were all mixed together, ground, and then pressed under 2000 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood. This block contains 4.4 percent cobalt.

This block has the characteristic mildly acid cobaltous taste. It is a light purple color. Its density is about .96 gram per cubic centimeter. When heated in an oven, it becomes sticky or tacky at about 80° C.

When employed as a nutrient block, as aforesaid, the block of this example is an excellent source of cobalt.

*Example 41*

A nutrient block was prepared from the following materials:

| | Grams |
|---|---|
| Calcium carbonate | 50 |
| Ammonium carbonate | 78 |
| Citric acid | 190 |
| Stearic acid, food grade | 136 |

The procedure of the fourth process was followed. The ingredients were all mixed together, ground, and then pressed under 2000 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood. This block contains 4.4 percent calcium.

This block has the characteristic taste of calcium. It is a white color. Its density is about 1.16 grams per cubic centimeter. Where heated in an oven, it becomes sticky or tacky at about 85° C.

When employed as a nutrient block, as aforesaid, the block of this example is an excellent source of calcium.

*Example 42*

A nutrient block was prepared from the following materials:

| | Grams |
|---|---|
| Zinc carbonate | 136 |
| Citric acid | 204 |
| Stearic acid, food grade | 114 |

The procedure of the fourth process was followed. The ingredients were all mixed together, ground, and then pressed under 2000 pounds per square inch pressure in the aforementioned Stokes punch press, operating at six tablets per minute. Three tablets were dipped in melted stearic acid, as was a disc of plywood of the aforementioned dimensions. The three tablets were stacked over the coated plywood disc and allowed to cool, whereupon a block was formed by the aggregation of tablets and plywood. This block contains 16.7 percent zinc.

This block has the characteristic mildly acid zincous taste. It is a white color. Its density is about .94 gram per cubic centimeter. When heated in an oven, it becomes sticky or tacky at about 80° C.

When employed as a nutrient block, as aforesaid, the block of this example is an excellent source of zinc.

It is understood that the term "nutrient composition" in the specification and claims herein, when referring to the novel compositions of this invention, includes, wherever the context so admits or requires, the nutrient blocks made from such compositions, and vice versa.

The term "wax" as used herein is used in the physical sense, as describing the appearance of the material. It is not used in the narrow chemical sense which solely embraces esters of fatty acids.

The term "stearic acid" includes commercial or chemically impure grades thereof, including food grade, wherever the context so admits or requires.

I claim:

1. A stable, weather-resistant, palatable, animal saliva-soluble nutrient composition in block form for supplying a single metal nutritive element to an animal, which consists essentially of an intimate mixture of an edible, waxy substance which is solid at ambient temperatures and which is a member selected from the group consisting of at least one substantially saturated fatty acid having from about 14 to about 20 carbon atoms, at least one ester of at least one substantially saturated fatty acid having from about 14 to about 20 carbon atoms and at least one alcohol corresponding to at least one substantially saturated fatty acid having from about 14 to about 20 carbon atoms and a member selected from the group consisting of:

(1) a saliva-soluble chelate of citric acid and the nutritive element, and (2) a saliva-soluble mixture consisting essentially of at least one water-soluble citric acid compound and the nutritive element in the form of a compound selected from the group consisting of a metal oxide, a metal hydroxide and a metal carbonate.

2. A nutrient composition in block form in accordance with claim 1, wherein said member is a saliva-soluble chelate of citric acid and the nutritive element.

3. A nutrient composition in block form in accordance with claim 1, wherein said member is a saliva-soluble mixture consisting essentially of at least one water-soluble citric acid compound and the nutritive element in the form of a compound selected from the group consisting of a metal oxide, a metal hydroxide and a metal carbonate.

4. A nutrient composition in accordance with claim 1, wherein said waxy substance is selected from the group consisting of myristic acid, arachidic acid and stearic acid.

5. A nutrient composition in accordance with claim 1, wherein the nutritive element in the form of a compound is selected from the group consisting of manganese, cobalt, nickel, copper, zinc, magnesium, calcium and iron.

6. A nutrient composition in accordance with claim 2, wherein the intimate mixture comprises about 15 percent to about 60 percent of the waxy substance and about 85 percent to about 40 percent of the water-soluble chelate, and said chelate contains from about 1 to about 3 mols of citric acid for each gram atomic weight of metal element.

7. A nutrient composition in accordance with claim 2, which composition also contains a sweetening agent.

8. A nutrient composition in accordance with claim 3 which composition also contains an ammonium compound selected from the group consisting of ammonium citrate, ammonium carbonate and ammonium bicarbonate.

9. A nutrient composition in accordance with claim 8 wherein the nutritive element material is selected from the group consisting of a metal hydroxide, a metal carbonate and a metal oxide.

10. A composition comprising an intimate mixture of about 20 percent of manganese carbonate, about 30 percent of ammonium citrate, about 25 percent of citric acid and about 25 percent of stearic acid, the percent being by weight of the total composition, said composition being stable, weather-resistant, palatable, animal saliva-soluble and suitable for supplying manganese as a nutritive element to an animal.

11. A composition comprising an intimate mixture of about 20 percent of ferrous carbonate, about 30 percent of ammonium citrate, about 25 percent of citric acid and about 25 percent of stearic acid, the percent being by weight of the total composition, said composition being stable, weather-resistant, palatable, animal saliva-soluble and suitable for supplying iron as a nutritive element to an animal.

12. A composition comprising an intimate mixture of about 20 percent of cobalt carbonate, about 30 percent of ammonium citrate, about 25 percent of citric acid and about 25 percent of stearic acid, the percent being by weight of the total composition, said composition being stable, weather-resistant, palatable, animal saliva-soluble and suitable for supplying cobalt as a nutritive element to an animal.

13. A composition comprising an intimate mixture of about 20 percent of copper carbonate, about 30 percent of ammonium citrate, about 25 percent of citric acid and about 25 percent of stearic acid, the percent being by weight of the total composition, said composition being stable, weather-resistant, palatable, animal saliva-soluble and suitable for supplying copper as a nutritive element to an animal.

14. A composition comprising an intimate mixture of about 20 percent of zinc carbonate, about 30 percent of ammonium citrate, about 25 percent of citric acid and about 25 percent of stearic acid, the percent being by weight of the total composition, said composition being stable, weather-resistant, palatable, animal saliva-soluble and suitable for supplying zinc as a nutritive element to an animal.

15. A composition comprising an intimate mixture of about 20 percent of nickel carbonate, about 30 percent of ammonium citrate, about 25 percent of citric acid and about 25 percent of stearic acid, the percent being by weight of the total composition, said composition being stable, weather-resistant, palatable, animal saliva-soluble and suitable for supplying nickel as a nutritive element to an animal.

16. A process for preparing a nutrient composition as set forth in claim 1, which comprises bringing said waxy substance and said member in finely divided form, into intimate contact with each other by pressing them together under a pressure of about 2,000 to 3,000 pounds per square inch, so as to form an integral, homogeneous mass.

References Cited by the Examiner

UNITED STATES PATENTS

| | | | |
|---|---|---|---|
| 2,489,758 | 11/49 | Dunn et al. | 99—2 |
| 2,683,664 | 7/54 | Greer | 99—2 |
| 2,926,085 | 2/60 | Gearlings | 99—2 |
| 2,960,406 | 11/60 | Cardon | 99—2 |
| 3,087,820 | 4/63 | Dawson | 99—2 |

OTHER REFERENCES

Martell, A. E., et al.: Chemistry of the Metal Chelate Compounds, Prentice-Hall, Inc., 1956.

A. LOUIS MONACELL, *Primary Examiner.*